UNITED STATES PATENT OFFICE.

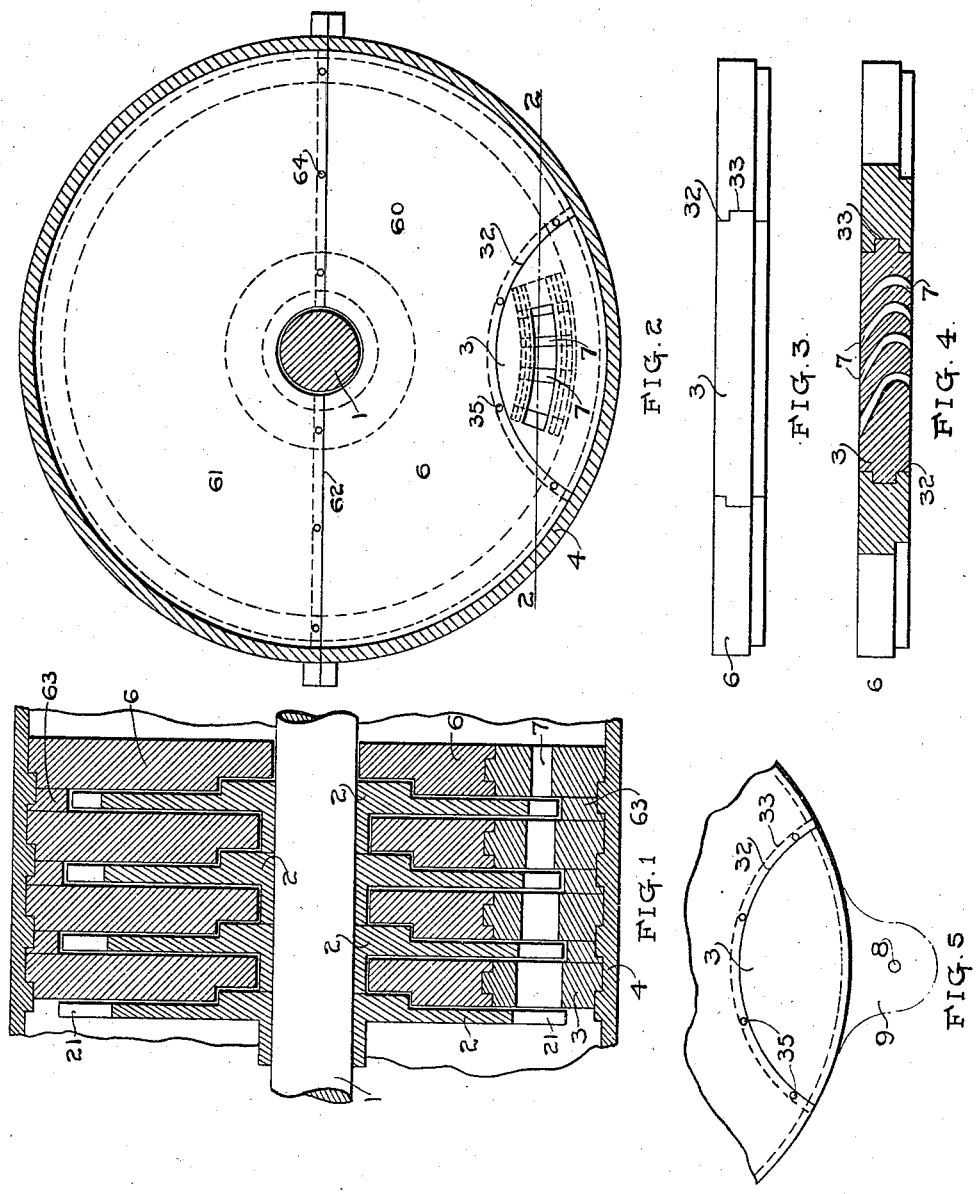

RUDOLPH SCHLATTER, OF MILWAUKEE, WISCONSIN, ASSIGNOR TO ALLIS-CHALMERS COMPANY, OF MILWAUKEE, WISCONSIN, A CORPORATION OF NEW JERSEY.

STEAM-TURBINE.

965,412. Specification of Letters Patent. Patented July 26, 1910.

Application filed May 3, 1909. Serial No. 493,638.

*To all whom it may concern:*

Be it known that I, RUDOLPH SCHLATTER, a citizen of the Republic of Switzerland, residing at Milwaukee, in the county of Milwaukee and State of Wisconsin, have invented certain new and useful Improvements in Steam-Turbines, of which the following is a specification.

This invention relates to improvements in the construction of turbines and in particular to such improvements in impulse turbines.

The object of the invention is to produce a construction which is easily manufactured and which will insure tight joints between the parts, thus preventing the passage of steam through said joints.

A clear conception of the invention can be obtained by referring to the accompanying drawings in which like reference characters designate the same or similar parts.

Figure 1 is a fragmentary central vertical section of an impulse turbine. Fig. 2 is an end view of the device shown in Fig. 1. Fig. 3 is a bottom view of one of the diaphragms which carry the nozzles. Fig. 4 is a similar view showing a section taken through the nozzles along the line 2—2 of Fig. 2. Fig. 5 is a fragment of one of the diaphragms showing the manner of assembling the nozzle carrying section in place on the diaphragm, the nozzles not being shown.

The impulse turbine, see Figs. 1, 2, has a main shaft 1 carrying the disks 2 which support the buckets 21. The disks 2 are separated from each other by the diaphragms 6 which are supported by the casing 4 and extend nearly to the shaft 1. These diaphragms 6 are spaced from each other by suitable spacing rings 63, which rings may be formed in one piece with the diaphragms 6. The diaphragms 6 are composed of two halves 61, 60, the parting between them being along the line 62. The diaphragms 6 are incomplete in circumferential extent or discontinuous at one portion of the periphery and are completed by nozzle sections co-acting therewith at such portions. The lower half 60 of the diaphragms 6 forms the support for the nozzle section 3 formed with the nozzles 7. The upper half 61 of the diaphragm 6 may also support a nozzle section 3 if desired, and it is not intended to confine the location of the section 3 to any specific portion of the periphery of diaphragm 6. The nozzle section 3 coacts with the diaphragm 6 along a revolutionary surface 32 and a groove 33 therein and is held in place by rivets 35. The nozzles 7 are formed in the nozzle section 3 in any suitable manner.

In constructing the diaphragm 6, the halves 61, 60, are first fitted together and fastened as by means of bolts 64. The diaphragm 6 is then turned concentric with the shaft 1. The surface 32 and the groove 33 are then bored into the diaphragm 6 with the center 8 as a center. The nozzle section 3, which has a temporary lug 9 formed thereon, has tongue surfaces corresponding to the surface 32 and those of the groove 33 formed upon it with the center 8 also used as a center. The section 3 is then assembled in place on the diaphragm, see Fig. 5, and is held there by the rivets 35. The lug 9 is then removed by turning the section 3 to the contour of the periphery of the diaphragm 6.

It should be understood that it is not desired to be limited to the exact details of construction shown and described, for obvious modifications will occur to a person skilled in the art.

It is claimed and desired to secure by Letters Patent:

1. In a turbine, a diaphragm incomplete in circumferential extent and a nozzle section completing said diaphragm, said section coacting with said diaphragm entirely at surfaces of revolution having a common axis.

2. In a turbine, a diaphragm discontinuous at one part of its periphery, and a nozzle section co-acting at said part of said diaphragm entirely at surfaces of revolution having a common axis.

In testimony whereof, I affix my signature in the presence of two witnesses.

RUDOLPH SCHLATTER.

Witnesses:
H. C. CASE,
G. F. DE WEIN.